(12) United States Patent
Shin et al.

(10) Patent No.: US 9,983,447 B2
(45) Date of Patent: May 29, 2018

(54) FLAT PANEL DISPLAY WITH NARROW BEZEL AREA

(71) Applicant: LG Display Co., Ltd., Seoul (KR)

(72) Inventors: Seunghwan Shin, Jeollabuk-do (KR); Jaehyung Jo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 265 days.

(21) Appl. No.: 14/878,138

(22) Filed: Oct. 8, 2015

(65) Prior Publication Data

US 2016/0103356 A1    Apr. 14, 2016

(30) Foreign Application Priority Data

Oct. 13, 2014    (KR) ........................ 10-2014-0137901

(51) Int. Cl.
*G02F 1/1345* (2006.01)

(52) U.S. Cl.
CPC ...... *G02F 1/13452* (2013.01); *G02F 1/13458* (2013.01); *G02F 2001/13456* (2013.01)

(58) Field of Classification Search
CPC ............. G02F 1/13452; G02F 1/13456; G02F 1/13458
USPC ................................................ 349/149–152
See application file for complete search history.

(56) References Cited

U.S. PATENT DOCUMENTS

| | | | |
|---|---|---|---|
| 2003/0081161 A1 | 5/2003 | Ozawa | |
| 2010/0026951 A1* | 2/2010 | Chiang | G02F 1/13452 349/150 |
| 2011/0193239 A1* | 8/2011 | Horiguchi | G02F 1/13452 257/773 |
| 2013/0057801 A1 | 3/2013 | Park et al. | |
| 2013/0058020 A1 | 3/2013 | Jo et al. | |
| 2013/0088671 A1 | 4/2013 | Drzaic | |
| 2013/0120231 A1 | 5/2013 | Jo et al. | |
| 2013/0148072 A1* | 6/2013 | Jang | G02F 1/13439 349/150 |
| 2014/0085585 A1 | 3/2014 | Sung et al. | |

FOREIGN PATENT DOCUMENTS

| | | |
|---|---|---|
| CN | 102998831 A | 3/2013 |
| CN | 103163702 A | 6/2013 |
| CN | 103842898 A | 6/2014 |
| JP | 2006235348 A | 9/2006 |

OTHER PUBLICATIONS

Extended European Search Report issued in corresponding European Patent Application No. 15189365.8 dated Jan. 7, 2016.
The First Office Action dated Feb. 8, 2018 from the State Intellectual Property Office of the People's Republic of China in related Chinese application No. 201510843607.0.
Communication dated Feb. 1, 2018 from the European Patent Office in counterpart EP application No. 15189365.8.

* cited by examiner

*Primary Examiner* — Thanh-Nhan P Nguyen

(74) *Attorney, Agent, or Firm* — Morgan, Lewis & Bockius LLP

(57) ABSTRACT

A flat panel display module includes a display panel configured to comprise a display area and a first pad that is out of the display area; and an auxiliary panel configured to include a first auxiliary pad disposed on one side, a second auxiliary pad disposed on the other side, and an auxiliary connection line that connects the first auxiliary pad and the second auxiliary pad, wherein the first auxiliary pad is connected to the first pad.

18 Claims, 8 Drawing Sheets

FLAT PANEL DISPLAY WITH NARROW BEZEL AREA

This application claims the priority benefit of Korean Patent Application No. 10-2014-0137901 filed on Oct. 13, 2014, which is incorporated herein by reference for all purposes as if fully set forth herein.

BACKGROUND

Field of the Invention

The present invention relates to a flat panel display module, a liquid crystal display module, and a liquid crystal display.

Discussion of the Related Art

There have been rapid developments in display devices, among which Flat Panel Display devices (FPDs), which are thin and light, and capable of being manufactured to be large-area flat panel displays, are used to replace a Cathode Ray Tube (CRT) having bulky volume. Examples of the FPD include a Liquid Crystal Display Device (LCD), a Plasma Display Panel (PDP), an Organic Light Emitting Display Device (OLED), an Electrophoretic Display Device (EPD), and the like, among which the LCD displays images by controlling electric fields applied to liquid crystal molecules according to a data voltage. An active matrix type LCD, which may be manufactured with low costs and high performance achieved by the development of processing and operating technologies, is most widely used in applications of almost all display devices ranging from small mobile devices to large televisions.

Recently, with an increasing demand for the LCD and with the development of the LCD technology, there have been various demands regarding external designs of the LCD from an aesthetic point of view, including an increasing demand for an LCD with a reduced bezel area.

Hereinafter, a structure of a general LCD will be described by reference to FIGS. 1 and 2. FIG. 1 is a plan view schematically illustrating a structure of a general LCD. FIG. 2 is a cross-sectional view taken along line I-I' in FIG. 1 schematically illustrating a structure of a general LCD.

The general LCD includes a display panel LCP, a backlight unit BLU that emits light to the display panel LCP, and a driver that drives the display panel LCP.

The display panel LCP includes a lower substrate TFS on which a display area AA and a non-display area NA are defined, an upper substrate CFS that is disposed on an upper surface of the AA, and a liquid crystal cell LC that is interposed between the lower substrate TFS and the upper substrate CFS.

A color filter having a pattern of red, green, and blue, or having a pattern of red, green, blue, and white is disposed on the upper substrate CFS. A black matrix may be further disposed thereon.

The display area AA and the non-display area NA are defined on the lower substrate TFS. A plurality of gate lines that are arranged in one direction and a plurality of data lines that are arranged in a direction perpendicular to the gate lines are formed in the display area AA. Further, a plurality of pixel electrodes are arranged in a matrix form in a pixel area defined by the intersection of the gate lines and the data lines. A plurality of thin film transistors that are switched according to a signal of the gate lines to transmit a signal of the data lines to each pixel electrode is formed. A first pad PD1 that is connected to the data lines through link lines LN is formed in the non-display area NA.

A liquid crystal cell LC is driven by a voltage difference between a pixel electrode that charges a data voltage through a thin film transistor and a common electrode to which a common voltage is applied. The common electrode may be formed on the upper substrate CFS or on the lower substrate TFS depending on the types of a liquid crystal display.

In order to enable the display panel LCP to perform an optical function, a top polarizer TPOL may be formed on the front surface of the upper substrate CFS, and a bottom polarizer BPOL may be formed on the rear surface of the lower substrate TFS. The top polarizer TPOL and the bottom polarizer BPOL are disposed such that light transmission axes thereof cross orthogonal to each other.

The backlight unit BLU is disposed on the rear surface of the display panel LCP. The backlight unit BLU includes a light source LA that generates light and a light guide plate LG that guides light from the light source LA to the display panel LCP. A reflection sheet REF is disposed on the rear surface of the light guide plate LG, and an optical sheet is disposed on the front surface of the light guide plate LG. The optical sheet OPT may include a diffusion sheet, a prism sheet, or a protective sheet.

A cover bottom CB is disposed on the bottom of the display panel LCP and the backlight unit BLU. The cover bottom CB is desired to be formed in a manner that protects and supports the display panel LCP and the backlight unit BLU.

A driver includes a data driver that supplies a data signal to the data lines a gate driver that sequentially supplies a gate pulse synchronized with a data signal to the gate lines of pixels and a timing controller that controls the data driver and the gate driver.

The timing controller transmits digital data of an input image to the data driver and controls the timing of operations of the data driver and the gate driver. The gate driver may be formed in a Gate In Panel GIP circuit on at least one edge or on both edges of the lower substrate TFS. In the GIP, a gate driver circuit is directly formed on the display panel LCP, thereby minimizing an area occupied by the gate driver.

A data driver that drives the display panel LCP is provided on at least one outer edge of the lower substrate TFS. The data driver includes a Printed Circuit Board PCB to drive the display panel LCP and a source drive IC that is electrically connected to the Printed Circuit Board PCB to supply signals to the display panel LCP. The source drive IC supplies signals to the data lines through the first pad PD1 formed in the non-display area NA of the lower substrate TFS. The first pad PD1 and the data lines are electrically connected through connection lines LN.

The source drive IC may be mounted on the connection member TP. For example, the connection member TP may be a Tape Carrier Package (TCP), in which one side of the connection member TP is connected to the first pad PD1 formed on the lower substrate TFS by Tape Automated Bonding (TAB), and the other side thereof is connected to the second pad PD2 on the Printed Circuit Board PCB.

The Printed Circuit Board PCB is disposed on the rear surface of the lower substrate TFS. As illustrated in FIG. 2, the Printed Circuit Board PCB may be disposed on the bottom of the cover bottom CB. FIG. 1 illustrates the connection member TP before being bent for convenience of explanation, but in practice, the connection member TP is bent along the edges of the lower substrate TFS as illustrated in FIG. 2. The connection member TP is disposed by being bent such that the Printed Circuit Board PCB is disposed on the rear surface of the lower substrate TFS.

The non-display area NA of the lower substrate CFS and the driver are desired not to be seen when a users view the liquid crystal display. Accordingly, a case top CTOP is disposed to cover the edges of the upper substrate CFS, the non-display area NA of the lower substrate TFS, and the driver.

An upper surface of the case top CTOP disposed on four sides of the display panel LCP is bezel areas BZS, BZU, and BZL. When a liquid crystal display is viewed from the front, the bezel areas BZS, BZU, and BZL are portions of the black edges (shown with a thick line) of four sides of the surface.

As illustrated in FIG. 1, the bezel areas BZU and BZS formed on the top, left, and right sides of the display panel LCP may have a narrow width, since a driver is not included in the bezel areas BZS, BZU, and BZL or a gate driver formed in a GIP circuit is included therein.

However, the bezel area BZL formed at the bottom side of the display panel LCP is formed to have a relatively wide width, since an additional area is required to mount the data driver and the display panel LCP which are separately formed and electrically connected using the connection member TP. Such mounting area is caused to increase the bezel area BZL. The bezel areas BZS, BZU, and BZL result in undesirable aesthetic characteristics, and thus are needed to be minimized.

SUMMARY

Accordingly, the present invention is directed to a flat panel display with narrow bezel area that substantially obviates one or more of the problems due to limitations and disadvantages of the related art.

The present embodiments provide a flat display panel with a minimized bezel area, a flat panel display module using the flat display panel, and/or a flat panel display device using the flat panel display module. Further, the present embodiments provide a flat display panel including an auxiliary display area formed in a remaining area of an auxiliary panel to display additional information desired by a user, a flat panel display module using the flat display panel, and/or a flat panel display device using the flat panel display module.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages an in accordance with the purpose of the present invention, as embodied and broadly described, a flat panel display module comprises a display panel configured to comprise a display area and a first pad that is disposed out of the display area; and an auxiliary panel configured to comprise a first auxiliary pad disposed on one side, a second auxiliary pad disposed on the other side, and an auxiliary connection line that connects the first auxiliary pad and the second auxiliary pad, wherein the first auxiliary pad is connected to the first pad.

In another aspect, a liquid crystal display module comprises a lower substrate configured to comprise a display area and a first pad that is disposed out of the display area; an upper substrate configured to be attached to the display area; and an auxiliary panel configured to comprise a first auxiliary pad disposed on one side, a second auxiliary pad disposed on the other side, and an auxiliary connection line that connects the first auxiliary pad and the second auxiliary pad, wherein the first auxiliary pad is connected to the first pad.

In the other aspect, a liquid crystal display comprises a lower substrate configured to comprise a display area and a first pad that is disposed out of the display area; an upper substrate configured to be attached to the display area; an auxiliary panel configured to comprise a first auxiliary pad disposed on one side, a second auxiliary pad disposed on the other side, and an auxiliary connection line that connects the first auxiliary pad and the second auxiliary pad; and a backlight unit configured to disposed on a rear surface of the lower substrate, wherein the first auxiliary pad is connected to the first pad.

It is too be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
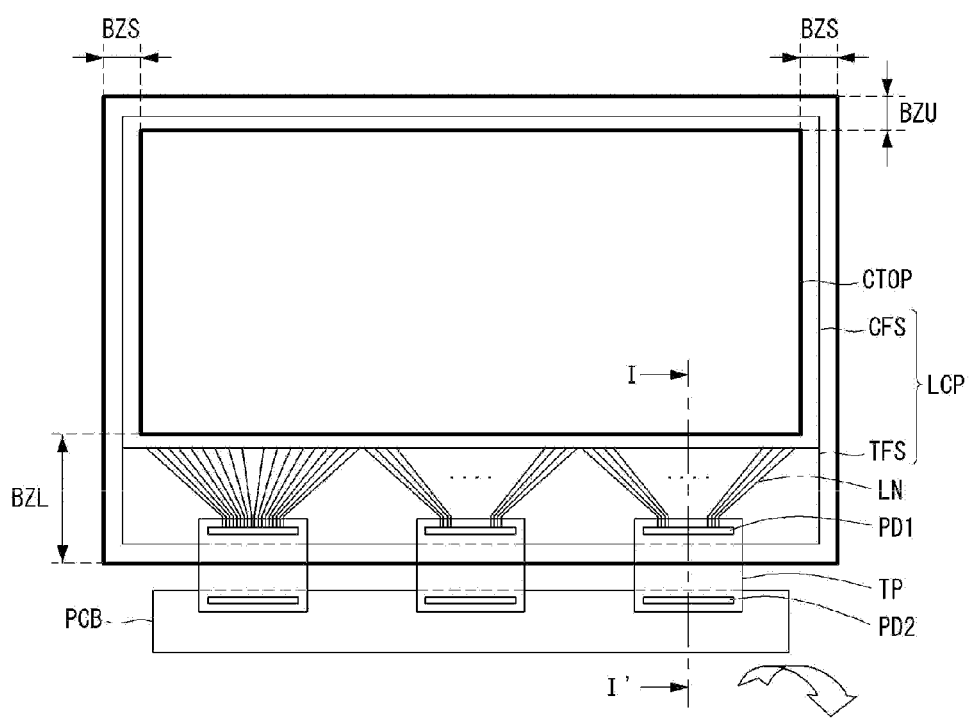
FIG. 1 is a plan view schematically illustrating a structure of a general liquid crystal display.
Figure 2:
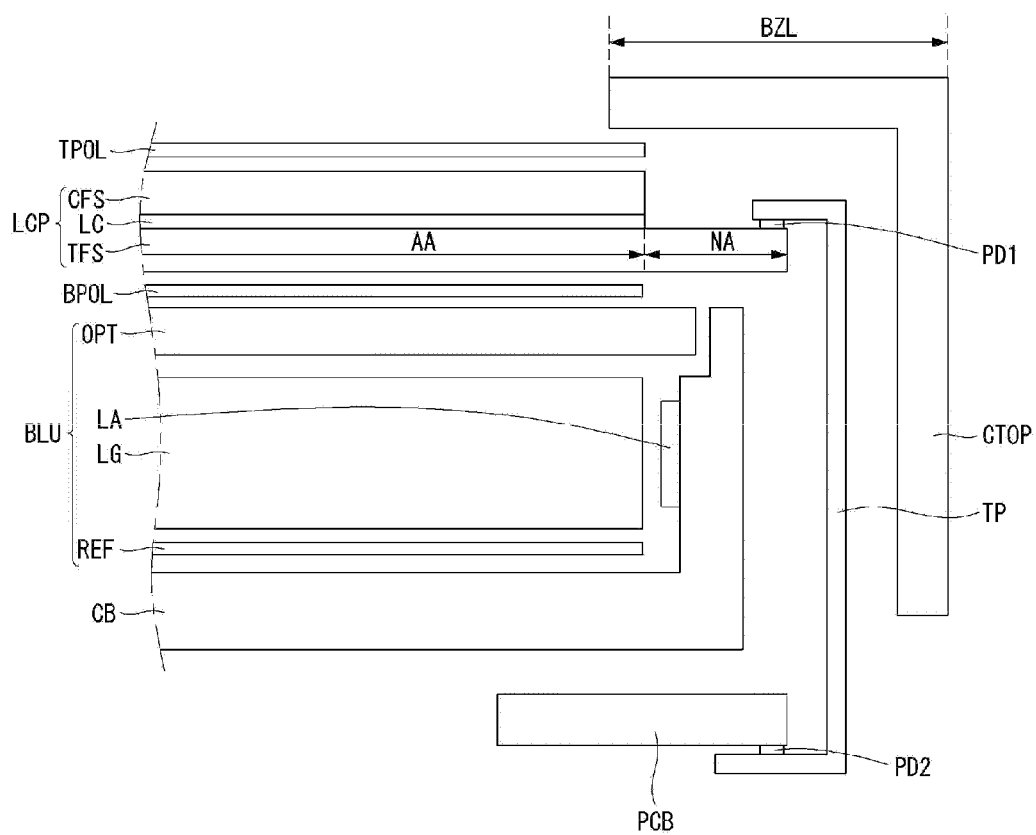
FIG. 2 is a cross-sectional view taken along line I-I' in FIG. 1 schematically illustrating a structure of a general liquid crystal display.
Figure 3:
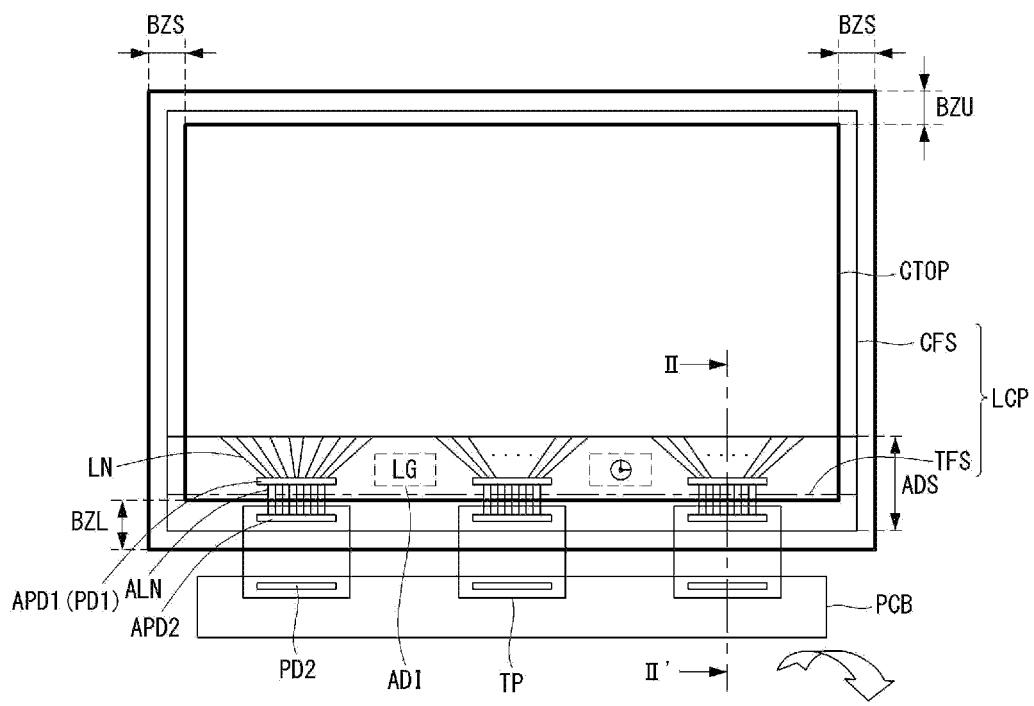
FIG. 3 is a plan view schematically illustrating a structure of a liquid crystal display according to an exemplary embodiment of the present disclosure.
Figure 4:
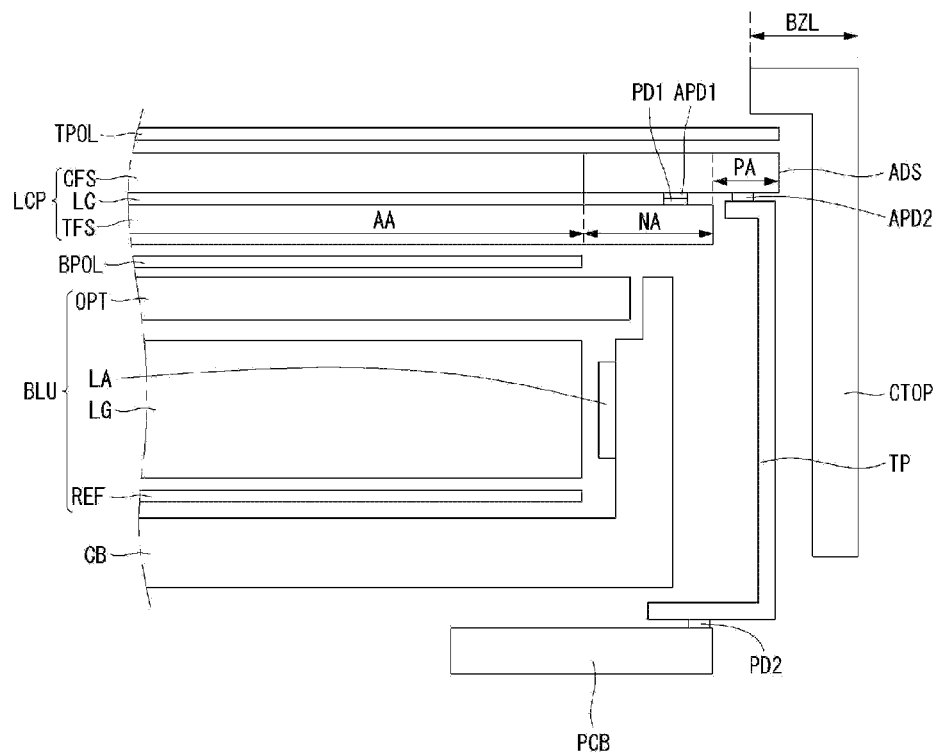
FIG. 4 is a cross-sectional view taken along line II-II' in FIG. 3 schematically illustrating a structure of a liquid crystal display according to an exemplary embodiment of the present disclosure.

Hereinafter, the liquid crystal display according to embodiments of the present disclosure will be described by reference to FIGS. 3 and 4. FIG. 3 is a plan view schematically illustrating a structure of a liquid crystal display according to an exemplary embodiment of the present disclosure. FIG. 4 is a cross-sectional view taken along line II-II' in FIG. 3 schematically illustrating a structure of a liquid crystal display according to an exemplary embodiment of the present disclosure.

The liquid crystal display includes a display panel LCP, a backlight unit BLU that emits light to the display panel LCP, an auxiliary panel ADS that is electrically connected to the display panel LCP, and a driver that drives the display panel LCP.

The display panel LCP includes a lower substrate TFS on which a display area AA and a non-display area NA are defined, an upper substrate CFS that is disposed on the display area AA, and a liquid crystal cell LC that is interposed between the lower substrate TFS and the upper substrate CFS.

The display area AA and the non-display area NA are defined on the lower substrate TFS. A plurality of gate lines that are arranged in a first direction and a plurality of data lines that are arranged in a second direction crossing the first direction are formed in the display area AA. Further, a plurality of pixel electrodes are arranged in a matrix form in a pixel area defined by the intersection of the gate lines and the data lines. A plurality of thin film transistors that are switched according to a signal of the gate lines to transmit a signal of the data lines to each pixel electrode are formed. A first pad PD1 that is connected to the data lines through the connection lines LN is formed in the non-display area NA.

The upper substrate CFS is disposed at a position corresponding to the display area AA of the lower substrate TFS. A color filter having a pattern of red, green, and blue, or having a pattern of red, green, blue, and white is disposed on the upper substrate CFS. A black matrix may be further disposed thereon. However, the color filter is not limited thereto, and may also be disposed on a thin film transistor of the lower substrate TFS.

A liquid crystal cell LC is driven by a voltage difference between a pixel electrode that charges a data voltage through a thin film transistor and a common electrode to which a common voltage is applied. The common electrode may be formed on the upper substrate CFS or on the lower substrate TFS depending on the types of a liquid crystal display.

The backlight unit BLU is disposed on the rear surface of the display panel LCP, and includes a light source LA that generates light and a light guide plate LG that guides light from the light source LA to the display panel LCP. A reflection sheet REF is disposed on the rear surface of the light guide plate LG, and an optical sheet is disposed on the front surface of the light guide plate LG. The optical sheet OPT may include a diffusion sheet, a prism sheet, or a protective sheet.

A cover bottom CB is disposed on the bottom of the display panel LCP and the backlight unit BLU. The cover bottom CB is desired to be formed in a manner that protects and supports the display panel LCP and the backlight unit BLU.

An auxiliary panel ADS is made of the same material as the upper substrate CFS and is disposed on the same plane as the upper substrate CFS. Further, the auxiliary panel ADS is disposed at a position corresponding to the non-display area NA of the lower substrate TFS and is extended to protrude out of the lower substrate TFS. A portion formed to protrude out of the lower substrate TFS is referred to as a protrusion PA. The auxiliary panel ADS includes a first auxiliary pad APD1 that directly contacts the first pad 1 PD1 formed on the lower substrate TFS, a second auxiliary pad APD2 that is formed on the protrusion PA, and an auxiliary connection line ALN that electrically connects the first auxiliary pad APD1 and the second auxiliary pad APD2.

The first auxiliary pad APD1 is formed at a position that corresponds to the position of the first pad PD1 so as to directly contact the first pad PD1. Further, the first auxiliary pad APD1 is formed on one surface of the auxiliary panel ADS that faces a surface of the lower substrate TFS on which the first pad PD1 is formed. The second auxiliary pad APD2 is formed on the same surface as a surface of the auxiliary panel ADS on which the first auxiliary pad PD1 is formed. In this case, the second auxiliary pad APD2 is placed at a predetermined distance apart from the first auxiliary pad APD1, and is electronically connected to the first auxiliary pad APD1 through the auxiliary connection line ALN.

An auxiliary display area ADI that may display images may be formed on the auxiliary panel ADS. The auxiliary display area ADI may be formed in an area (hereinafter referred to as a "remaining area") where the first auxiliary pad APD1, the second auxiliary pad APD2, and the auxiliary connection line ALN are not formed. The auxiliary display area ADI may be formed to display simple images, such as logos, channels, or clocks. In this case, thin film transistors may be formed in the remaining area on the auxiliary panel ADS so that simple images may be displayed on the auxiliary display area ADI.

In order to enable the display panel LCP to perform an optical function, a top polarizer TPOL may be formed on the front surface of the upper substrate CFS, and a bottom polarizer BPOL may be formed on the rear surface of the lower substrate TFS. The top polarizer TPOL and the bottom polarizer BPOL are disposed such that light transmission axes thereof cross orthogonal to each other. In this case, the top polarizer TPOL may be extended to be positioned on the front surface of the auxiliary panel ADS.

The driver includes a data driver that supplies a data signal to the data lines, a gate driver that sequentially supplies a gate pulse synchronized with a data signal to the gate lines of pixels, and a timing controller that controls the data driver and the gate driver.

The timing controller transmits digital data of an input image to the data driver and controls the timing of operations of the data driver and the gate driver. The gate driver may be formed in a Gate In Panel GIP circuit on at least one edge or on both edges of the lower substrate TFS. In the GIP, a gate driver circuit is directly formed on the display panel LCP, thereby minimizing an area occupied by the gate driver.

A data driver that drives the display panel LCP is provided on at least one outer edge of the lower substrate TFS. The data driver includes a Printed Circuit Board PCB (or a drive substrate) to drive the display panel LCP, and a source drive IC that is electrically connected to the Printed Circuit Board PCB to supply signals to the display panel LCP.

The source drive IC supplies signals to the data lines through the second auxiliary pad APD2 formed on the auxiliary panel ADS. That is, the signals supplied by the source drive IC are provided in order from the second auxiliary pad APD2, the first auxiliary pad APD1, and the first pad PD1 to the data lines. In this case, the first pad PD1 and the data lines are electrically connected through the connection lines LN.

The source drive IC may be mounted on a connection member TP. For example, the connection member TP may be a Tape Carrier Package (TCP). One side of the connection member TP is connected to the second auxiliary pad APD2 formed on the auxiliary panel ADS, and the other side thereof is connected to the second pad PD2 on the Printed Circuit Board PCB. The second auxiliary pad APD2 may be connected to the connection member TP and the second pad PD2 may be connected to the connection member TP by Tape Automated Bonding (TAB).

The Printed Circuit Board PCB is disposed on the rear surface of the lower substrate TFS. As illustrated in FIG. 4, the Printed Circuit Board PCB may be disposed on the bottom of a cover bottom CB. FIG. 3 illustrates the connection member TP before being bent for convenience of explanation, but in practice, the connection member TP is bent to the rear surface of the protrusion PA as illustrated in FIG. 4. The connection member TP is disposed by being bent such that the Printed Circuit Board PCB is disposed on the rear surface of the lower substrate TFS. The position of the Printed Circuit Board PCB is not limited thereto, and the Printed Circuit Board PCB may also be disposed on the side of the cover bottom CB or at other positions. The connection member TP is desired to be formed not to protrude out of one side edge of the auxiliary panel ADS.

As illustrated in FIG. 3, a case top CTOP is disposed to cover the edges of top, left, and right sides of the upper substrate CFS and to cover the edges of bottom, left, and right sides of the auxiliary panel ADS (shown with a thick line). An upper surface of the case top CTOP disposed to cover four sides of the surface is bezel areas BZS, BZU, and BZL.

Among the four sides of the surface, the bezel areas BZS, BZU, and BZL formed on the top, left, and right sides thereof may have a narrow width, since a driver is not included in the bezel areas BZS, BZU, and BZL or a gate driver formed in a GIP circuit is included therein.

More specifically, upon comparison with the related art, a bezel area BZL was required to have a wide width to cover a step formed between the upper substrate CFS and the lower substrate TFS and to cover the non-display area NA of the lower substrate TFS and the data driver that may be exposed on the surface. By contrast, in the present disclosure, an auxiliary panel ADS is disposed on the same plane as the upper substrate CFS to cover the non-display area NA of the lower substrate TFS and the data driver. The auxiliary panel ADS may cover a step formed between the upper substrate CFS and the lower substrate TFS and may cover the non-display area NA of the lower substrate TFS and the data driver so as not to be exposed on the surface. Accordingly, a case top CTOP is sufficient to be disposed to cover only the edges of the auxiliary panel ADS, thereby minimizing the bezel area BZL.

Further, the auxiliary panel ADS, which is made of the same material as the upper substrate CFS, is formed to have the same texture and color as the upper substrate CFS. In this manner, when a liquid crystal display is viewed from the front by a user, a visual sensation difference between the auxiliary panel ADS and the upper substrate CFS that is exposed on the surface may be prevented, thereby enabling a user to feel an identical visual sensation.

Figure 5:
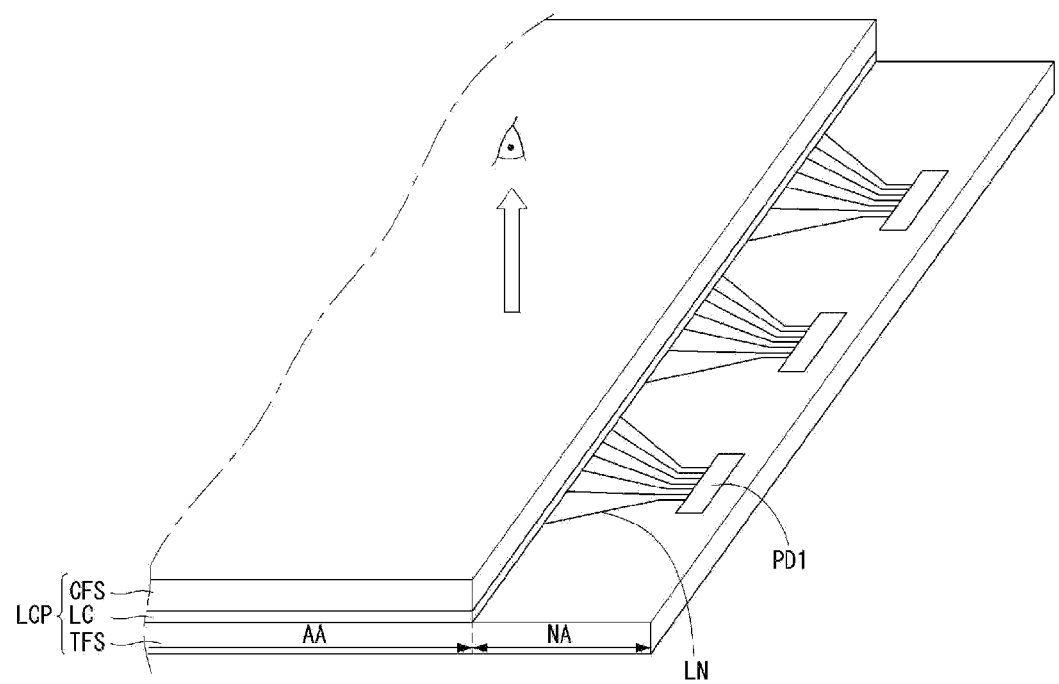
FIGS. 5 to 7 are views explaining a connective relationship among a display panel, an auxiliary panel, and a data driver.
Figure 6:
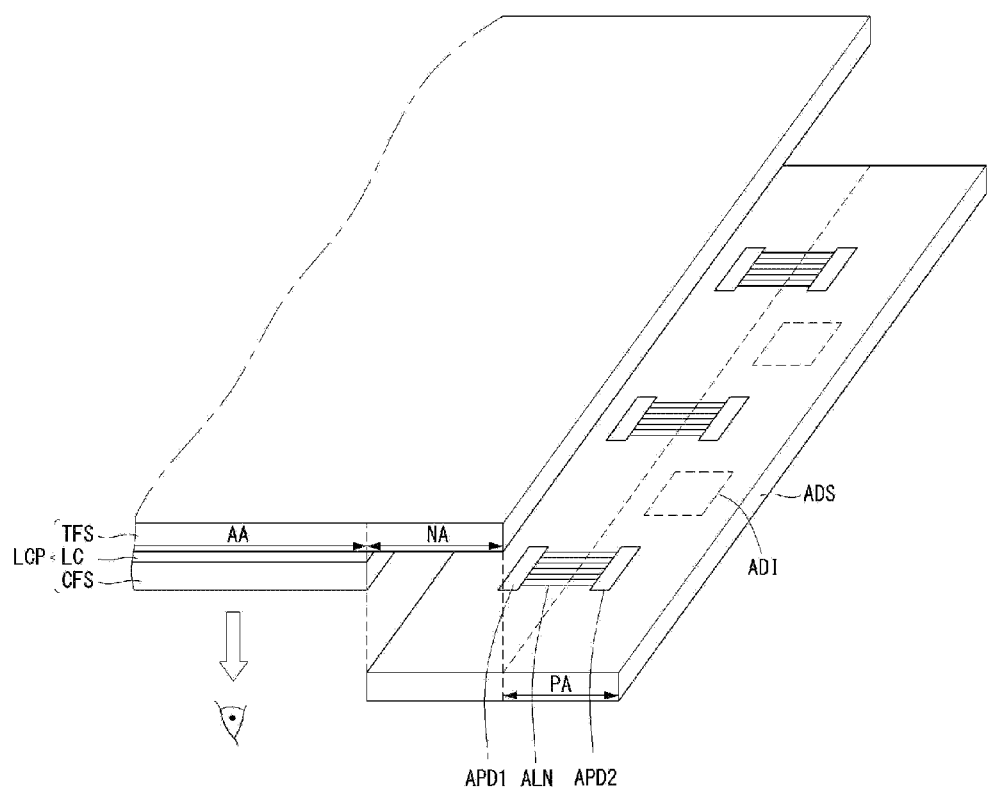
Figure 7:
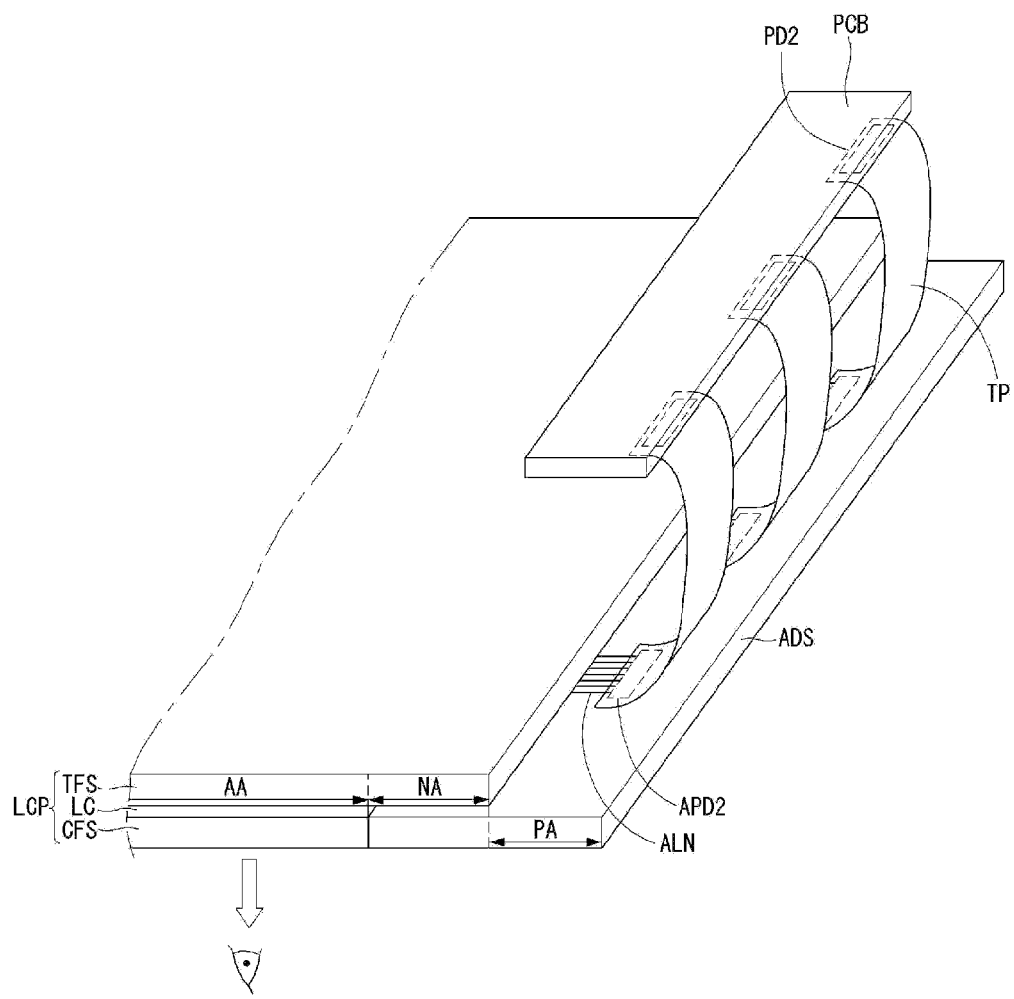

Hereinafter, a liquid crystal display module, i.e., a connective relationship among a display panel LCP, an auxiliary panel ADS, and a data driver will be described in further detail with reference to FIGS. 5 to 7. FIGS. 5 to 7 are diagrams explaining the connective relation between the display panel, the auxiliary panel, and the data driver.

Referring to FIG. 5, the display panel LCP includes the lower substrate TFS on which the display area AA and the non-display area NA are defined, the upper substrate CFS disposed at a position corresponding to the display area AA of the lower substrate TFS, and a liquid crystal cell LC interposed between the lower substrate TFS and the upper substrate CFS. A first pad PD1 is formed in the non-display area NA of the lower substrate TFS. The first pad PD1 is electrically connected to the data lines formed in the display area AA of the lower substrate TFS through the connection lines LN. FIG. 5 illustrates three first pads PD1, but the first pad PD1 is not limited thereto, and at least one or more first pads PD1 may be formed if necessary. In the case where a plurality of first pads PD1 are formed, the first pads PD1 may be spaced apart from each other at regular intervals.

FIG. 6 illustrates the reverse of the display panel LCP in FIG. 5 for convenience of explanation. Referring to FIG. 6, the auxiliary panel ADS includes a first auxiliary pad APD1, a second auxiliary pad APD2 that is placed at a predetermined distance apart from the first auxiliary pad APD1, and an auxiliary connection line ALN that electrically connects the first auxiliary pad APD1 and the second auxiliary pad APD2. The first auxiliary pad APD1 is formed to directly contact the first pad PD1 formed in the non-display area NA of the lower substrate TFS. Accordingly, the number of the first auxiliary pad APD1 is identical to the number of the first pads PD1 formed in the non-display area NA of the lower substrate TFS. Further, the first auxiliary pad APD1 is formed at a position corresponding to the first pad PD1.

When viewed from the front, the second auxiliary pad APD2 is formed at a protrusion PA of the auxiliary panel ADS that protrudes out of the edge of the non-display area NA of the lower substrate TFS. The number of the second auxiliary pad APD2 may be identical to the number of the first auxiliary pad APD1, but is not limited thereto, and at least one or more second auxiliary pad APD2 may be formed to be electrically connected to the first auxiliary pad APD1 through the auxiliary connection line ALN.

An auxiliary display area ADI may be formed in a remaining area of the auxiliary panel ADS where the first auxiliary pad APD1, the second auxiliary pad APD2, and the auxiliary connection line ALN are not formed. The auxiliary display area ADI may be formed to display simple images, such as logos, channels, or clocks. Thin film transistors may be formed in the remaining area on the auxiliary panel ADS so that simple images may be formed in the auxiliary display area ADI.

The auxiliary panel may be formed when the lower substrate TFS is manufactured. In the case of manufacturing a plurality of lower substrates TFS using one mother substrate, rather than using the entire area of the mother substrate, some parts of the mother substrate is used and the rest remains unused. By using such remaining area, the auxiliary panel ADS may be formed when the lower substrate TFS is manufactured. In this case, by using a gate electrode material or a source/drain electrode material, the first auxiliary pad APD1 and the second auxiliary pad APD2 on the auxiliary panel ADS may be formed when a gate electrode or a source/drain source electrode is formed on the lower substrate TFS. Otherwise, the auxiliary panel ADS may be formed separately from the lower substrate TFS.

Referring to FIG. 7, the auxiliary panel ADS is disposed on the same plane as the upper substrate CFS and at a position corresponding to the non-display area NA of the lower substrate TFS. When viewed from the front, the protrusion PA of the auxiliary panel ADS is disposed to protrude out of the edge of the lower substrate TFS. In this case, the first pad PD1 of the lower substrate TFS directly contacts the first auxiliary pad APD1 of the auxiliary panel ADS. The first pad PD1 may be attached to the first auxiliary pad APD1 using a silver paste (Ag-Dot), a conductive film, or the like. However, the attachment method is not limited thereto, and any method may be used as long as the first pad PD1 and the first auxiliary pad APD1 may be attached to be electrically connected to each other. The second auxiliary pad PD2 is connected to the second pad PD2 formed on the Printed Circuit Board PCB through the connection member TP. The connection member TP may be connected to the second auxiliary pad APD2 and to the second pad PD2 by TAB. A source drive IC may be mounted on the connection member TP.

The connection member TP having ductility characteristics is bent to the rear surface of the lower substrate TFS. In this case, when viewed from the front, the connection member TP is desired to be formed not to protrude out of the edge of the auxiliary panel ADS, since if the connection member TP protrudes out of the edge of the auxiliary panel ADS, a bezel area is required to be provided separately to cover the protrusion.

In this manner, the data line, the first pad PD1, the first auxiliary pad APD1, the second auxiliary pad APD2, and the second pad PD2 are electrically connected. The data driver is disposed on the rear surface of the auxiliary panel ADS, such that the data driver is covered by the auxiliary panel ADS and may not be seen when viewed from the front of a liquid crystal display. Accordingly, the case top (CTOP in FIG. 3) is sufficient to be disposed to cover only the edge of the auxiliary panel ADS. In the present disclosure, the liquid crystal display may have the bezel area of a narrow width.

The present disclosure provides a liquid crystal display having a minimized bezel area, thereby improving aesthetic characteristics of the liquid crystal display. Further, in the liquid crystal display with a narrow bezel area, identical visual sensation of the upper substrate and the auxiliary panel when viewed by a user may be provided.

In the present disclosure, the liquid crystal display includes an auxiliary display area to display simple images on the auxiliary panel, thereby providing additional information required by a user.

Figure 8:
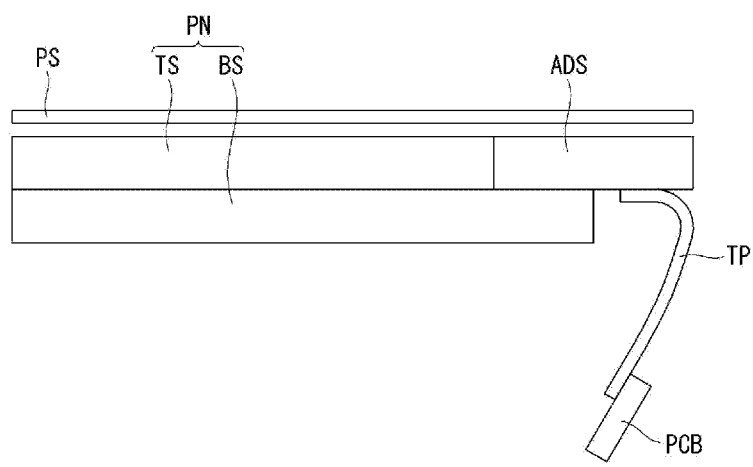
FIG. 8 is a view schematically illustrating a structure of a flat panel display device according to an exemplary embodiment of the present disclosure.

The above disclosure is described by taking an example of the liquid crystal display for convenience, but is not limited thereto. The present disclosure may be applied to a flat panel display device including a driver that is mounted separately from a display panel. For example, referring to FIG. 8, the flat panel display device according to the present disclosure includes a flat panel display module, i.e., a flat display panel PN, an auxiliary panel ADS, a Printed Circuit Board PCB (or a drive substrate), and the like. The flat display panel PN may include an upper substrate TS and a lower substrate BS, an organic light emitting display device, and the like. A protection substrate PS may be further included on an upper portion that covers the flat display panel PN and the auxiliary panel ADS. As described above, the flat display panel PN, the auxiliary panel ADS, and the Printed Circuit Board PCB are electrically connected. Further, the Printed Circuit Board PCB is electrically connected to the auxiliary panel ADS through a connection member TP, and a connection member TP is disposed by being bent. In this case, the backlight unit, the polarizer, and the like described above may not be included.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flat panel display module, comprising:
   a display panel configured to comprise a display area and a first pad that is disposed out of the display area;
   an auxiliary panel configured to be disposed at one side of the display panel to overlap the display panel and comprise a first auxiliary pad disposed on one side, a second auxiliary pad disposed on the other side, and an auxiliary connection line that connects the first auxiliary pad and the second auxiliary pad;
   a printed circuit board configured to be apart from the auxiliary panel and comprise a second pad; and
   a connection member configured to electrically connect the second auxiliary pad of the auxiliary panel to the second pad of the printed circuit board,
   wherein the first auxiliary pad is connected to the first pad.

2. The flat panel display module of claim 1, wherein:
   the auxiliary panel comprises a protrusion that protrudes out of the display panel; and
   the second auxiliary pad is disposed on the protrusion of the auxiliary panel.

3. The flat panel display module of claim 1, wherein the printed circuit board is disposed on a rear surface of the display panel.

4. The flat panel display module of claim 1, further comprising an auxiliary display area that is disposed on a remaining area of the auxiliary panel.

5. The flat panel display module of claim 1, wherein the connection member does not protrude out of edges of the auxiliary panel.

6. The flat panel display module of claim 1, further comprising a source drive IC electrically connected to the printed circuit board to supply signals to the display panel.

7. A liquid crystal display module, comprising:
   a lower substrate configured to comprise a display area and a first pad that is disposed out of the display area;
   an upper substrate configured to be attached to the display area;
   an auxiliary panel configured to be disposed at one side of the upper substrate to overlap the lower substrate and comprise a first auxiliary pad disposed on one side, a second auxiliary pad disposed on the other side, and an auxiliary connection line that connects the first auxiliary pad and the second auxiliary pad;
   a printed circuit board configured to be apart from the auxiliary panel and comprise a second pad; and
   a connection member configured to electrically connect the second auxiliary pad of the auxiliary panel to the second pad of the printed circuit board,
   wherein the first auxiliary pad is connected to the first pad.

8. The liquid crystal display module of claim 7, wherein:
   the auxiliary panel comprises a protrusion that protrudes out of the lower substrate; and
   the second auxiliary pad is disposed on the protrusion of the auxiliary panel.

9. The liquid crystal display module of claim 7, wherein:
   the upper substrate and the auxiliary panel are disposed to face an upper surface of the lower substrate; and
   the printed circuit board is disposed on a rear surface of the lower substrate.

10. The liquid crystal display module of claim 7, further comprising an auxiliary display area that is disposed on a remaining area of the auxiliary panel.

11. The liquid crystal display module of claim 7, wherein the connection member does not protrude out of edges of the auxiliary panel.

12. The liquid crystal display module of claim 7, further comprising a source drive IC electrically connected to the printed circuit board to supply signals to the display panel.

13. A liquid crystal display, comprising:
   a lower substrate configured to comprise a display area and a first pad that is disposed out of the display area;
   an upper substrate configured to be attached to the display area;

an auxiliary panel configured to comprise a first auxiliary pad disposed on one side, a second auxiliary pad disposed on the other side, and an auxiliary connection line that connects the first auxiliary pad and the second auxiliary pad;
a backlight unit configured to disposed on a rear surface of the lower substrate;
a printed circuit board configured to be apart from the auxiliary panel and comprise a second pad; and
a connection member configured to electrically connect the second auxiliary pad of the auxiliary panel to the second pad of the printed circuit board,
wherein the first auxiliary pad is connected to the first pad.

14. The liquid crystal display of claim 13, wherein:
the auxiliary panel comprises a protrusion that protrudes out of the lower substrate; and
the second auxiliary pad is disposed on the protrusion of the auxiliary panel.

15. The liquid crystal display of claim 13, wherein:
the upper substrate and the auxiliary panel are disposed to face an upper surface of the lower substrate; and
the printed circuit board is disposed on a rear surface of the backlight unit.

16. The liquid crystal display of claim 13, further comprising an auxiliary display area that is disposed on a remaining area of the auxiliary panel.

17. The liquid crystal display of claim 13, wherein the connection member does not protrude out of edges of the auxiliary panel.

18. The liquid crystal display of claim 13, further comprising a source drive IC electrically connected to the printed circuit board to supply signals to the display panel.

* * * * *